Sept. 19, 1950  R. BATTAGLIA  2,523,182
STEELFLEX TIRE
Filed Aug. 27, 1947

INVENTOR.
Robert Battaglia
BY Victor J. Evans & Co.
ATTORNEYS

Patented Sept. 19, 1950

2,523,182

UNITED STATES PATENT OFFICE 2,523,182

STEELFLEX TIRE

Robert Battaglia, Lake Charles, La.

Application August 27, 1947, Serial No. 770,867

1 Claim. (Cl. 152—202)

This invention relates to improvements in pneumatic tire casings and more particularly to a casing having a flexible mesh embedded therein between the various layers thereof.

The use of the flexible steel mesh which extends from bead to bead of the casing will greatly diminish the possibilities of a blowout. It will tend to preserve the age of the casing, making it snag and cut-proof. The thinness of the mesh would prevent the mesh from absorbing or retaining road heat or temperature heat, and since heat is one of the primary causes for shortening the lift of a casing, such a casing as proposed will last and wear longer than present day casings.

The casing equipped with the flexible mesh can be recapped more often than present day casings, since the mesh serves as a base and protects the layers of rubber, and the bead core which forms the base of the casing. Increase of speed can be achieved without danger of blowout. A casing of this type would have a wider tread, eliminating the belly effect apparent in present day casings, thereby aiding in better driving and steering of the front wheels of a vehicle.

The object of the invention, therefore, is to provide a pneumatic tire casing having a flexible wire mesh embedded therein which gives the casing blowout proof qualities, gives longer life, cooler running and provides a casing that can be more frequently recapped.

Figure 1:
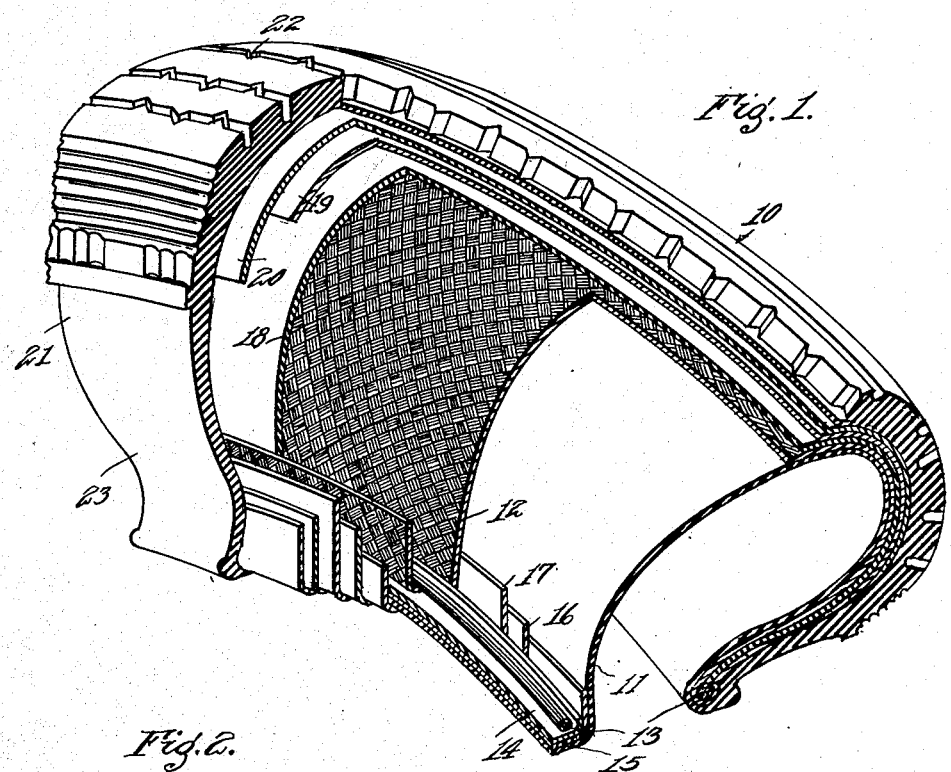
Figure 2:
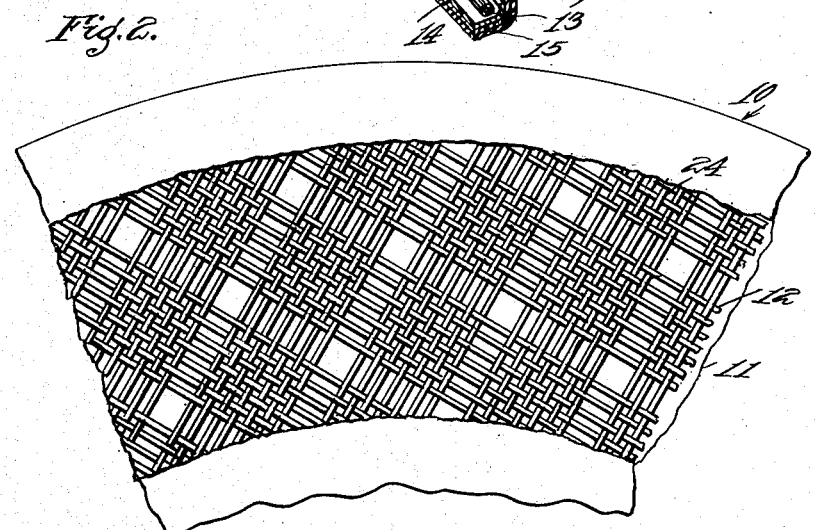

With the above and other objects and advantages in view, the invention consists of the novel details of construction, arrangement and combination of parts more fully hereinafter described, claimed and illustrated in the accompanying drawing in which:

Figure 1 shows a cutaway section of a casing embodying the invention showing the various layers used in the construction thereof and Figure 2 shows a cutaway section enlarged to show the construction of the wire mesh embedded in the casing.

Referring more in detail to the drawing, the reference numeral 10 designates a section of a casing constructed in accordance with the invention. The casing comprises the inner layer of rubber 11 upon which is placed in the construction of the tire, the metal flexible mesh layer 12. The layer 11 encloses the metal bead core 13 which is covered with the usual finishing strips 14, 15, 16 and 17 intermediate of the layers 11 and 12. It will be noticed that the layer 12 extends about the bead core within the strip 17 as seen in Figure 1. Placed on the layer 12 in the construction of the casing 10, is a second layer of rubber 18, on which is placed the breaker strip 19, and on which is placed a third layer of rubber 20 on which is placed the outer layer of rubber 21, comprising the tread portion 22 and side walls 23. The finishing strips are placed over the layer 12, as shown in Figure 1, and the layer 20 firmly binds the layer 12 in position.

In Figure 2, the construction of the mesh layer 12 is shown wherein the strands 24 thereof have an overlapping over and under arrangement which provides a strong structure and permits the rubber layers 11 and 18 to thoroughly permeate the mesh so that all layers are firmly bound together.

Thus a casing has been provided which, it is believed, will accomplish the objects of the invention, and it is believed that from the foregoing description, the construction of the casing will be apparent to those skilled in the art. It is also to be understood that changes in the minor details of construction and arrangement of the various parts thereof may be resorted to, provided they fall within the spirit of the invention and the scope of the appended claim.

Having thus described the invention, what is claimed as new and desired to be secured by Letters Patent is:

A tire casing of the character described, comprising a plurality of layers of rubber of various consistencies and a layer of flexible steel mesh interposed between said layers to provide a blowout proof structure, said layers comprising a first layer of rubber, a second layer of rubber, a breaker strip and a third layer of rubber having an outer casing layer formed thereon, said layers being superimposed on each other with the flexible mesh layer interposed between said first and second layers of rubber, a metal bead core enclosed by the first layer of rubber, finishing strips on the metal bead core interposed along one edge between the first layer and the mesh layer and along the opposite edge outwardly of the mesh layer.

ROBERT BATTAGLIA.

REFERENCES CITED

The following references are of record in the file of this patent:

UNITED STATES PATENTS

| Number | Name | Date |
|---|---|---|
| 1,138,027 | Varnell | May 4, 1915 |
| 1,145,993 | Hunter | July 13, 1915 |
| 1,438,663 | Roderick | Dec. 12, 1922 |